(12) United States Patent
Wei et al.

(10) Patent No.: US 8,483,390 B2
(45) Date of Patent: Jul. 9, 2013

(54) SYSTEMS AND METHODS FOR BROADCAST ENCRYPTION OPTIMIZATION AND SCALABILITY

(75) Inventors: Victor Keh Wei Wei, Hong Kong (HK); Zhibin Lei, Hong Kong (HK); Yiu Wing Wat, Hong Kong (HK); Wing Pan Leung, Hong Kong (HK)

(73) Assignee: Hong Kong Applied Science & Technology Research Institute Company, Ltd., Hong Kong (HK)

( * ) Notice: Subject to any disclaimer, the term of this patent is extended or adjusted under 35 U.S.C. 154(b) by 101 days.

(21) Appl. No.: 13/249,237

(22) Filed: Sep. 30, 2011

(65) Prior Publication Data

US 2013/0083924 A1    Apr. 4, 2013

(51) Int. Cl.
*H04L 9/00* (2006.01)
(52) U.S. Cl.
USPC ......................................................... 380/255
(58) Field of Classification Search
USPC ......................................................... 380/255
See application file for complete search history.

(56) References Cited

U.S. PATENT DOCUMENTS

2008/0085005 A1 * 4/2008 Jung et al. ..................... 380/282
2010/0067702 A1 * 3/2010 Kusakawa et al. ............. 380/282

OTHER PUBLICATIONS

Xu et al.,"Computation-Efficient Multicast Key Distribution", May 2008, IEEE Ransactions on Parallel and Distributed Systems, vol. 19, No. 5, pp. 577-586.*
D. Boneh, C. Gentry, B.Waters, "Collusion Resistant Broadcast Encryption With Short Ciphertexts and Private Keys", CRYPTO'05, Proceedings of 25th Annual international Cryptology Conference on Advances in Cryptology, London, UK, 2005, pp. 1-19.

* cited by examiner

*Primary Examiner* — Matthew Smithers

(57) ABSTRACT

A content distribution method with broadcast encryption, comprising: executing a setup process, comprising: generating public domain parameters, generating a server secret, and generating one or more client private keys, one for each content receiving client; executing an encryption process, comprising: generating a cipher text using the server secret, a subscriber set, and a randomness, the cipher text being constant and independent of total number of content receiving clients in a distribution network, generating a plain text using the server secret and the randomness, encrypting an original content into an encrypted content using the plain text; distributing the client private keys to the content receiving clients; distributing the cipher text to the content receiving clients; broadcasting the encrypted content through the distribution network; and executing a decryption process on the encrypted content by each of the content receiving clients in the distribution network.

14 Claims, 1 Drawing Sheet

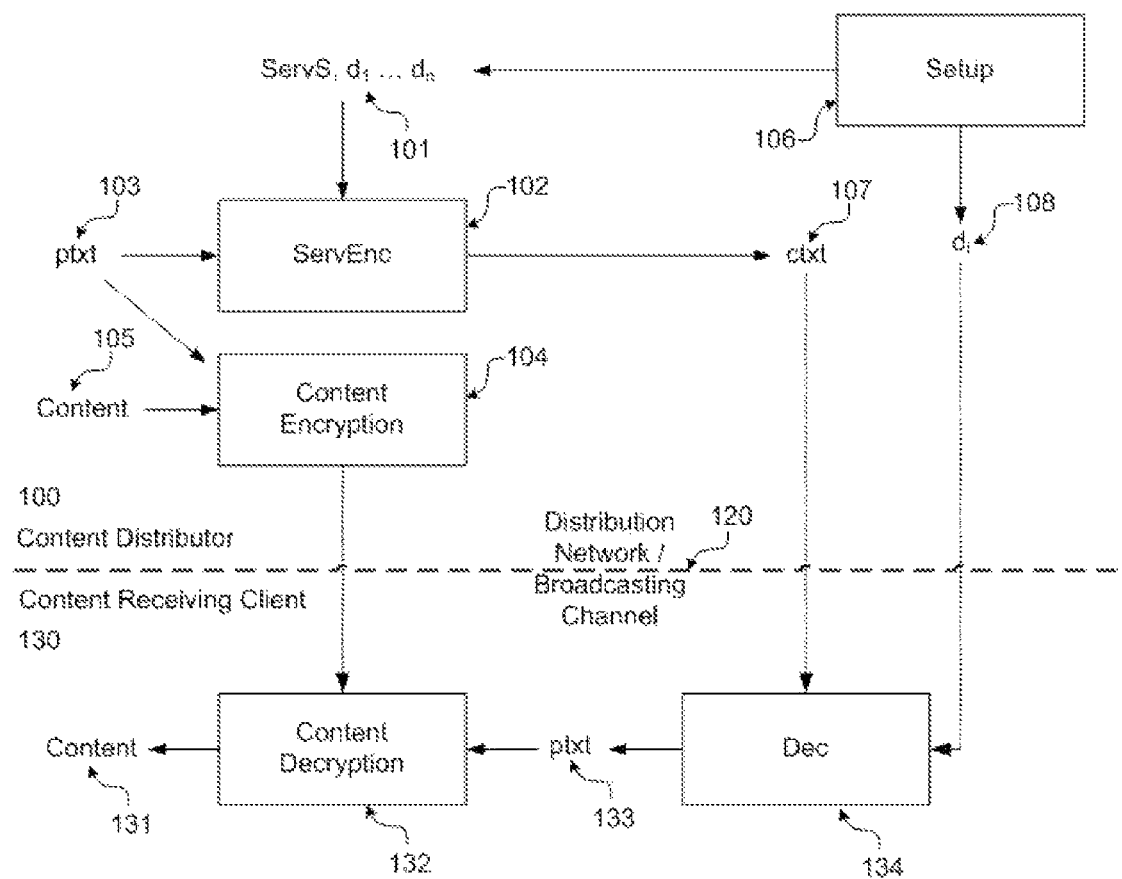

SYSTEMS AND METHODS FOR BROADCAST ENCRYPTION OPTIMIZATION AND SCALABILITY

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The presently claimed invention relates generally to networks, in particular, a computer network or a broadcast network such as television. Specifically, the presently claimed invention relates to encryption schemes used for encrypting privileged content distributed in a network.

BACKGROUND

In a broadcast encryption scheme, a content distributor encrypts its privileged content for users or clients who are listening on a broadcast channel or a distribution network. Any user or client can use his private key to decrypt the encrypted content received, but only the chosen subset of users or clients can decrypt the encrypted content into the original content. The content distributor can control and select for this subset. Broadcast encryption has several applications including access control in encrypted file systems, television subscription services, and media content protection.

Traditional broadcast encryption schemes, such as those using Public Key Infrastructure (PKI) or bilinear pairings, create cryptographic headers that grow proportionately with the size of the user population or subscriber base, or the total number of clients in the distribution network. Since the cryptographic headers are sent along with the encrypted content to the users or clients, it causes network performance degradation when the total user population is exceedingly large, and also as the subscriber base grows.

Therefore, there is a need for a new broadcast encryption scheme such that the cryptography headers are of constant sizes regardless of total user population and changes in the subscriber base.

SUMMARY

It is an objective of the presently claimed invention to provide a method and a system for content distribution with a broadcast encryption scheme with cryptography header of constant size.

Under the presently disclosed Differential Group Key Broadcast Encryption (DGKBE) scheme, the generated cipher text is constant in size and is independent of the total number content receiving clients in the distribution network.

In accordance to one embodiment, the DGKBE is an ordered combination of processes comprising the Setup, Encryption, and Decryption processes. The Setup and Encryption processes are executed at the content distributor whereas the Decryption process is executed at the content receiving client. In a television broadcasting network, a content receiving client typically is a receiver set top box.

The Setup process generates a server secret data set and the client private keys. The server secret data set includes at least rationale points taken from an elliptic curve, random numbers that are members of a finite field, the initial subscriber set, which is set to all the content receiving clients in the distribution network, and an initial randomness number. The client private keys are also generated from the rationale points, and are distributed to the content receiving clients in the distribution network.

The Encryption process takes the server secret data set, the subscriber set, and a randomness to generate a cipher text and a plain text. The plain text is used to encrypt the original content into encrypted content. The cipher text is broadcast to the distribution network along with the encrypted content.

The Decryption process takes the cipher text and a client private key to recreate the plain text for decrypting the encrypted content. If the content receiving client belongs to the subscriber set, its corresponding private key data would have been included in the generation of the cipher text during the Encryption process. Therefore, the plain text recreated by a subscriber content receiving client will correctly decrypt the encrypted content into the original content.

Because the size of the cipher text is proportional to a finite number of rationale points on the elliptic curve used, the cipher text is of constant size and independent of the total number of content receiving clients in the distribution network.

BRIEF DESCRIPTION OF THE DRAWINGS

Embodiments of the invention are described in more detail hereinafter with reference to the drawings, in which:

FIG. 1 shows a block diagram schematically illustrating an exemplary content distribution system executing the processes of an embodiment of the Differential Group Key Broadcast Encryption (DGKBE) disclosed herein.

DETAILED DESCRIPTION

In the following description, systems and methods of content distribution with Differential Group Key Broadcast Encryption (DGKBE) are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The Differential Group Key Broadcast Encryption (DGKBE) is an ordered combination of processes comprising the Setup, Encryption, and Decryption processes, which can be mathematically represented by:

tuple(Setup, ServEnc, Dec)

Referring to FIG. 1. The Setup 106 and ServEnc 102 processes are executed at the content distributor 100, typically by one or more computer servers. The primary output of the Setup process 106 is the server secret data set ServS and the client private keys $d_1, \ldots, d_n$ 101 to be processed by the ServEnc process 102. From the Setup process, each of client private keys $d_i$ 108 is also distributed to each content receiving client 103 with identifier i via a distribution network or broadcasting channel 120. The ServEnc process 102 processes the server secret data set ServS and the client private keys $d_1, \ldots, d_n$ 101 to generate a plain text ptxt 103 to be used to encrypt the original content 105 in the content encryption stage 104 and a cipher text ctxt 107 to be distributed to the content receiving client 103 along with the encrypted content via the distribution network or broadcasting channel 120. The Dec process 134 is executed by each of the content receiving client 130 in the distribution network. In a television broadcasting network, a content receiving client typically is a receiver set top box. When the content receiving client i 130 receives the cipher text ctxt 107 and the encrypted content, the Dec process 134 takes the client private key $d_i$ 108 received and preserved prior, and the cipher text ctxt 107 to re-generate the plain text ptxt 133 for decrypting the encrypted content in the content decryption stage 132. The result is the content 131 that is equal to the original content 105 broadcasted by the content distributor 100.

The Setup process Setup accepts as input a security parameter $1^{\lambda,s}$, a finite field $F_p$, where p is a prime power, an elliptic curve C, rationale points g which belongs to the elliptic curve C and order(g)=r, where r is a prime number, random numbers $\alpha$ and $\gamma$, which $\alpha, \gamma \in F_p$, to produce the output comprising a set of public-domain parameters param, which includes at least the total number of content receiving clients n in the distribution network. The process also output the server secret data set ServS, which includes at least the rationale points g, the random numbers $\alpha$ and $\gamma$, the initial subscriber set $S_0$, which is set to all the content receiving clients in the distribution network, and an initial randomness number $t_0$. The server secret data set can be mathematically represented by:

$$\text{ServS}=\{g, \alpha, \gamma, S_0, t_0\}$$

The process also output the client private keys $d_1, \ldots, d_n$, one for each content receiving client in the distribution network. In accordance to one embodiment, each client private key includes three key strings. The client private keys are computed as follows:

$$d_i=(d_{1,i}, d_{2,i}, d_{3,i});$$

where i denotes the identifier of the content receiving client that receive the particular client private key; or $i \in \{1, \ldots, n\}$ $$d_{1,i}=g_i^\gamma$$

$$d_{2,i}=g_i$$

$$d_{3,i}=\Pi_{j \in S_0, j \neq i}\, g_{n+1-j+i}$$

The Encryption process ServEnc accepts as inputs the set of public-domain parameters param, the server secret data ServS, the client private keys $d_1, \ldots, d_n$, the subscriber set S, which is a subset of all the content receiving clients in the distribution network or $S \subset \{1, \ldots, n\}$, and a randomness number t to produce the output comprising a plain text ptxt and a cipher text ctxt. The plain text ptxt is computed as follows:

$$\text{ptxt} = \hat{e}(g_n, g_1)^t$$

The plain text ptxt is then used to encrypt the original content into encrypted content to be distributed to the content receiving clients. In accordance to one embodiment, the cipher text includes three cipher text strings. The cipher text ctxt is computed as follows:

$$\text{ctxt}=(C_0, C_1, C_2)$$

$$C_0=g^t$$

$$C_1=(v\Pi_{j \in S}\, g_{n+1-j})^t,$$

where $$v=g^\gamma$$

$$C_2=(\Pi_{j \in S \setminus S_0}\, g_{n+1-j})^{t/\gamma}(\Pi_{j \in S_0 \setminus S}\, g_{n+1-j})^{-t/\gamma}$$

Because $C_0$, $C_1$, and $C_2$ are one elliptic curve point each, the size of the cipher text ctxt is only three points, thus constant and independent of the total number of content receiving clients n in the distribution network.

The Encryption process Dec accepts as inputs the client private key $d_i$, which is unique for the content receiving client i, and the cipher text ctxt to recreate the plain text ptxt used to encrypt the original content into encrypted content. The plain text ptxt is computed as follows:

$$\text{ptxt}=\hat{e}(d_{2,i}, C_1)\, \hat{e}(d_{1,i}d_{3,i}, C_0)^{-1}\, \hat{e}(C_2, d_{1,i})^{-1}$$

If the content receiving client i is a subscriber, that is if $i \in S_0 \cap S$, the ptxt recreated in the Dec process equals to the ptxt generated in the ServEnc process.

When a subscriber set changes due to addition or cancellation of one or more subscribers, a new cipher text can be computed based on the current one as follows:

$\text{ctxt}'=(C_{0'}, C_{1'}, C_{2'})$, where ctxt' is the current cipher text corresponding to the current subscriber set S' and current randomness t'

$\text{ctxt}=(C_0, C_1, C_2)$, where ctxt is the new cipher text corresponding to the new subscriber set S and new randomness t $$C_0 = (g^{t'})^{t/t'}$$
$$= (C_0')^{t/t'}$$

$$C_1 = \left(\left(v\prod_{j \in S'} g_{n+1-j}\right)\left(\prod_{j \in S \setminus S'} g_{n+1-j}\right)\right)^t$$
$$= (C_1')^{t/t'}\left(\prod_{j \in S \setminus S'} g_{n+1-j}\right)^t$$

$$C_2 = \left[\left(\prod_{j \in S \setminus S_0} g_{n+1-j}\right)\left(\prod_{j \in S_0 \setminus S} g_{n+1-j}\right)^{-1}\right]^{t/\gamma}$$
$$= \left[\left(\prod_{j \in S' \setminus S_0} g_{n+1-j}\right)\left(\prod_{j \in S_0 \setminus S'} g_{n+1-j}\right)^{-1}\right]^{(t'/\gamma)(t/t')}$$
$$\cdot \left[\left(\prod_{j \in (S \setminus S') \setminus S_0} g_{n+1-j}\right)\left(\prod_{j \in (S' \setminus S) \setminus S_0} g_{n+1-j}\right)^{-1}\right]^{(t'/\gamma)(t/t')}$$
$$= (C_2')^{t/t'}\left[\left(\prod_{j \in (S \setminus S') \setminus S_0} g_{n+1-j}\right)\left(\prod_{j \in (S' \setminus S) \setminus S_0} g_{n+1-j}\right)^{-1}\right]^t$$

As can be seen, since the new $C_0$, $C_1$, and $C_2$ are still one elliptic curve point each, the cipher text ctxt remains constant and independent of the total number of content receiving clients n in the distribution network.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A content distribution method with broadcast encryption, comprising:
   executing a setup process by a server presiding at the content distributor, the setup process comprising:
      generating public domain parameters, the public domain parameters comprising at least total number of content receiving clients in a distribution network;
      generating a server secret; and
      generating one or more client private keys, one for each content receiving client in the distribution network;
   executing an encryption process by a server presiding at the content distributor, the encryption process comprising:
      generating a cipher text using the server secret, a subscriber set, and a randomness, the cipher text being constant and independent of total number of content receiving clients in a distribution network;
      generating a plain text using the server secret and the randomness;
      encrypting an original content into an encrypted content using the plain text;
   distributing the client private keys to the content receiving clients in the distribution network;
   distributing the cipher text to the content receiving clients in the distribution network;
   broadcasting the encrypted content through a distribution network to the content receiving clients; and
   executing a decryption process on the encrypted content by each of the content receiving clients in the distribution network;
   wherein the subscriber set being a subset of all the content receiving clients in the distribution network and only those content receiving clients in the subscriber set can decrypt the encrypted content into the original content.

2. The method of claim 1, wherein the server secret comprises an initial subscriber set, an initial randomness, one or more rationale points on an elliptic curve, the initial subscriber set being all the content receiving clients in the distribution network, number of the rationale points being equal to total number of content receiving clients in the distribution network.

3. The method of claim 1, wherein each of said client private keys comprises three key strings, and each of the client private keys is unique for each content receiving client in the distribution network.

4. The method of claim 2, wherein each of said client private keys being generated from said rationale points.

5. The method of claim 1, wherein said cipher text comprises three cipher text strings.

6. The method of claim 1, where said decryption process by each of the content receiving clients in the distribution network further comprises:
   re-generating, by the content receiving client, the plain text from the client private key received by the content receiving client, and the cipher text; and
   decrypting, by the content receiving client, the encrypted content using the plain text re-generated by the content receiving client.

7. The method of claim 1, further comprising:
   generating a new cipher text when the subscriber set changes to a new subscriber set using the cipher text, the server secret, the subscriber set, the new subscriber set, the randomness, and a new randomness, the new cipher text being constant and independent of total number of content receiving clients in a distribution network.

8. A content distribution system with broadcast encryption, comprising:
   a setup server presiding at the content distributor for executing a setup process, the setup process comprising:
      generating public domain parameters, the public domain parameters comprising at least total number of content receiving clients in a distribution network;
      generating a server secret; and
      generating one or more client private keys, one for each content receiving client in the distribution network;
   an encryption server presiding at the content distributor for executing an encryption process, the encryption process comprising:
      generating a cipher text using the server secret, a subscriber set, and a randomness, the cipher text being constant and independent of total number of content receiving clients in a distribution network;
      generating a plain text using the server secret and the randomness;
      encrypting an original content into an encrypted content using the plain text;
   the distribution network for:
      distributing the client private keys to the content receiving clients in the distribution network, each content receiving client receiving one client private key;
      distributing the cipher text to the content receiving clients in the distribution network;
      broadcasting the encrypted content through a distribution network to the content receiving clients; and
   the content receiving clients in the distribution network for executing a decryption process on the encrypted content;
   wherein the subscriber set being a subset of all the content receiving clients in the distribution network and only those content receiving clients in the subscriber set can decrypt the encrypted content into the original content.

9. The system of claim 8, wherein the server secret comprises an initial subscriber set, an initial randomness, one or more rationale points on an elliptic curve, the initial subscriber set being all the content receiving clients in the distribution network, number of the rationale points being equal to total number of content receiving clients in the distribution network.

10. The system of claim 8, wherein each of said client private keys comprises three key strings, and each of the client private keys is unique for each content receiving client in the distribution network.

11. The system of claim 9, wherein each of said client private keys being generated from said rationale points.

12. The system of claim 8, wherein said cipher text comprises three cipher text strings.

13. The system of claim 8, where said decryption process by each of the content receiving clients in the distribution network further comprises:
   re-generating, by the content receiving client, the plain text from the client private key received by the content receiving client, and the cipher text; and
   decrypting, by the content receiving client, the encrypted content using the plain text re-generated by the content receiving client.

14. The system of claim 8, further comprising:
   generating a new cipher text when the subscriber set changes to a new subscriber set using the cipher text, the server secret, the subscriber set, the new subscriber set, the randomness, and a new randomness, the new cipher text being constant and independent of total number of content receiving clients in a distribution network.

* * * * *